(12) United States Patent
Nakajima (10) Patent No.: US 11,338,403 B2
(45) Date of Patent: May 24, 2022

(54) CHIP-SCATTERING PREVENTION COVER

(71) Applicant: KYOKUTOH CO., LTD., Nissin (JP)

(72) Inventor: Kotaro Nakajima, Nissin (JP)

(73) Assignee: KYOKUTOH CO., LTD., Nissin (JP)

( * ) Notice: Subject to any disclaimer, the term of this patent is extended or adjusted under 35 U.S.C. 154(b) by 62 days.

(21) Appl. No.: 16/852,079

(22) Filed: Apr. 17, 2020

(65) Prior Publication Data
US 2020/0238464 A1 Jul. 30, 2020

Related U.S. Application Data

(63) Continuation of application No. PCT/JP2018/027775, filed on Jul. 24, 2018.

(30) Foreign Application Priority Data

Nov. 20, 2017 (JP) .............................. JP2017-222415

(51) Int. Cl.
*B23Q 11/08* (2006.01)
*B23K 11/30* (2006.01)
(Continued)

(52) U.S. Cl.
CPC .............. *B23Q 11/08* (2013.01); *B23B 5/166* (2013.01); *B23C 3/12* (2013.01); *B23K 11/3063* (2013.01); *Y10T 409/304256* (2015.01)

(58) Field of Classification Search
CPC ..... Y10T 409/304144; Y10T 409/3042; Y10T 409/304256; B23K 11/3063;
(Continued)

(56) References Cited

U.S. PATENT DOCUMENTS 2,930,289 A * 3/1960 Swarts ............... B23K 11/3063
408/53
4,966,506 A 10/1990 Slanker
(Continued)

FOREIGN PATENT DOCUMENTS

CN 202726411 U 2/2013
CN 104084724 A 10/2014
(Continued)

OTHER PUBLICATIONS

EPO Machine Translation of KR 101696263 B1: "Chip collector unit for tip dresser, comprises chip collector for processing chip mounted on tip dresser for dressing welding tip pulled in accordance with rotation of cutting to"; Jan. 13, 2017.*
(Continued)

*Primary Examiner* — Boyer D Ashley
*Assistant Examiner* — Michael Vitale
(74) *Attorney, Agent, or Firm* — Womble Bond Dickinson (US) LLP; Joseph Bach, Esq.

(57) ABSTRACT

A chip scattering prevention cover (1) is attached to a head portion (6*b*) of a rotary cutter (6). The cover (1) includes an annular portion (1*a*) configured to be detachably fitted over an outer peripheral edge of the head portion (6*b*), and a plate portion (1*b*) extending inwardly of the annular portion (1*a*) from an inner circumference portion of the annular portion (1*a*). The plate portion (1*b*) is configured to cover a region of a cutout gap (6*e*) of the rotary cutter (6) corresponding to the head portion (6*b*) with the annular portion (1*a*) being fitted over the head portion (6*b*). The annular portion (1*a*) and the plate portion (1*b*) are flush with a surface of the head portion (6*b*) when the annular portion (1*a*) is fitted over the head portion (6*b*).

5 Claims, 5 Drawing Sheets

(51) Int. Cl.
   *B23C 3/12* (2006.01)
   *B23B 5/16* (2006.01)
(58) Field of Classification Search
   CPC ..... B23K 11/3072; B23K 11/312; B23C 3/12; B23C 3/122; B23B 5/166; B23Q 11/08
   USPC ........................................ 409/138, 139, 140
   See application file for complete search history.

(56) References Cited

U.S. PATENT DOCUMENTS

| | | | |
|---|---|---|---|
| 6,666,631 | B2 | 12/2003 | Yajima et al. |
| 2005/0238445 | A1* | 10/2005 | Johansson ............ B23B 27/145 407/113 |
| 2008/0075551 | A1* | 3/2008 | Nakazima .......... H03M 13/1128 409/140 |
| 2015/0217397 | A1* | 8/2015 | Nakajima ............... B23K 11/30 29/50 |
| 2015/0283645 | A1 | 10/2015 | Moision et al. |
| 2015/0298246 | A1* | 10/2015 | Nakajima .......... B23K 11/3072 219/86.8 |
| 2015/0360315 | A1 | 12/2015 | Kusano |
| 2016/0279733 | A1 | 9/2016 | Nakajima et al. |
| 2017/0225263 | A1* | 8/2017 | Sigler ................ B23K 11/3063 |

FOREIGN PATENT DOCUMENTS

| | | | | |
|---|---|---|---|---|
| CN | 204603557 | U | | 9/2015 |
| CN | 105636660 | A | | 6/2016 |
| CN | 106170364 | A | | 11/2016 |
| CN | 106695084 | A | | 5/2017 |
| DE | 10345714 | A1 | * 4/2005 | ......... B23K 11/3063 |
| FR | 1077766 | A | * 11/1954 | ............ B23B 5/166 |
| JP | 06-077980 | U | | 11/1994 |
| JP | 200744752 | A | | 2/2007 |
| JP | 2007090427 | A | * 4/2007 | ......... B23K 11/3063 |
| JP | 2008023589 | A | | 2/2008 |
| JP | 2011224597 | A | * 11/2011 | ......... B23K 11/3063 |
| KR | 200481245 | Y1 | | 9/2016 |
| KR | 101696263 | B1 | | 1/2017 |
| WO | 2016151623 | A1 | | 9/2016 |
| WO | 2019097766 | A1 | | 5/2019 |
| WO | WO-2019202710 | A1 | * 10/2019 | ............ B23K 11/36 |

OTHER PUBLICATIONS

Extended European Search Report from related EP Application No. 18878013.4 dated Mar. 9, 2021 (5 pages).

Indian Office Action from related IN Application No. 202017019822 dated Apr. 5, 2021 (6 pages).

Chinese Office Action from related Application No. CN 201880068672.2 dated Apr. 30, 2021 (16 pages including English translation).

International Search Report dated Oct. 9, 2018, for PCT/JP2018/027775, filed Jul. 24, 2018, 22 pages.

* cited by examiner

CHIP-SCATTERING PREVENTION COVER

CROSS-REFERENCE TO RELATED APPLICATION

This application is a continuation of International Application No. PCT/JP2018/027775 filed on Jul. 24, 2018, which claims priority to Japanese Application No. 2017-222415, filed Nov. 20, 2017, which are hereby incorporated by reference in its entirety and for all purposes.

TECHNICAL FIELD

The present disclosure relates to a chip-scattering prevention cover for preventing chips created during cutting operations from scattering when distal ends of electrode tips of spot welding are cut by using a tip dresser.

BACKGROUND OF THE DISCLOSURE

In conventional spot welding, it is known that an oxide film builds up on a distal end of an electrode tip upon repeated welding operations. Spot welding performed with an electrode tip distal end having the oxide film formed thereon renders deteriorated quality of a welded portion. For this reason, a tip dresser is generally used to periodically cut an electrode tip distal end and thus remove the oxide film.

When chips created during cutting an electrode tip distal end by using the tip dresser are scattered around, the chips may come into contact with the electrode tip and scratch its surface, or may stick to a drive unit of another apparatus and cause a breakdown of the drive unit. Such chips are thus needed to be prevented from scattering around as much as possible.

For addressing this issue, a tip dresser, for example, disclosed in WO2016/151623 includes a rotary cutter having a rotation axis that extends vertically, the rotary cutter including top and bottom surfaces provided with a pair of curved surfaces which can loosely fit respective electrode tips with a center axis of the electrode tips coinciding with the rotation axis. A cutout gap extending vertically and having ends adjacent to the respective curved surfaces is provided in a side of the rotary cutter. A plate shaped cutting part for cutting distal ends of the electrode tips is attached to an inner surface of the cutout gap. A cover casing is attached below the rotary cutter in the tip dresser to cover a lower curved surface. An opening corresponding to the lower curved surface is formed in the cover casing. Then, a chip scattering prevention cover being disk shaped and having an electrode tip insertion hole is secured to a top surface of the rotary cutter to cover an upper curved surface. When a pair of electrode tips are placed facing each other on vertically opposite sides of the rotary cutter and brought closer to each other with the rotary cutter being rotated about the rotation axis, a distal end of an upper electrode tip passes through the electrode tip insertion hole and is loosely fitted onto the upper curved surface to be cut by the cutting part, and a distal end of a lower electrode tip passes through the opening and is loosely fitted onto the lower curved surface to be cut by the cutting part. In so doing, chips created at the lower electrode tip come out from an opening side of the lower curved surface to move into the cover casing, thus preventing scatter. On the other hand, chips created at the upper electrode tip move to come out from an opening side of the upper curved surface, yet hit and bounce off the chip scattering prevention cover to move into the cover casing through the cutout gap, thus preventing scatter.

SUMMARY OF THE INVENTION

The chip scattering prevention cover as described in WO2016/151623 is secured to the top surface of the rotary cutter, so a space is needed to attach the chip scattering prevention cover over the rotary cutter, thus causing the tip dresser to be larger around the rotary cutter due to the space.

The chip scattering prevention cover then rotates integrally with the rotary cutter, so it is desirable that the chip scattering prevention cover has lighter weight as much as possible to reduce a load on the motor that rotates the rotary cutter.

The present disclosure is made in view of the foregoing and an object of the present disclosure is to provide a chip scattering prevention cover that enables a smaller size of the tip dresser around the rotary cutter and with which the motor driving the rotary cutter is less susceptible to a load.

To achieve the object, the present disclosure is characterized by devising a structure of a chip scattering prevention cover not to cover the entire surface of a rotary cutter.

Specifically, a chip scattering prevention cover is configured to be attached to a tip dresser rotary cutter including a shaft portion having a central axis aligned with a rotation axis; a disk shaped head portion formed at one end of the shaft portion and unitary with the shaft portion on a back surface side thereof to have a rotation axis aligned with the rotation axis; a curved surface formed at a center of the head portion and capable of fitting loosely an electrode tip of spot welding with a central axis of the electrode tip being aligned with the rotation axis; a cutout gap extending along the rotation axis to reach the curved surface for a continuous cutout in the shaft portion and the head portion; and a cutting part configured to be attached to an inner surface of the cutout gap, having a blade portion that extends in a direction intersecting with the rotation axis, and configured to cut by the blade portion the electrode tip loosely fitted onto the curved surface due to rotation about the rotation axis, for preventing chips created during cutting of the electrode tip by the blade portion from scattering. The following solutions are then applied.

According to a first aspect of the present disclosure, the chip scattering prevention cover includes an annular portion configured to be detachably fitted over an outer peripheral edge of the head portion; and a plate portion extending inwardly of the annular portion from an inner circumference portion of the annular portion and configured to cover a region of the cutout gap corresponding to the head portion when the annular portion is fitted over the head portion, wherein the annular portion and the plate portion are positioned not to protrude beyond a level of a surface of the head portion when the annular portion is fitted over the head portion.

According to a second aspect of the present disclosure which is an embodiment of the first aspect, the annular portion and the plate portion are flush with the surface of the head portion when the annular portion is fitted over the head portion.

According to a third aspect of the present disclosure which is an embodiment of the first or second aspect, one or more through-holes extending through in a plate thickness direction are formed in the plate portion.

According to a fourth aspect of the present disclosure which is an embodiment of the third aspect, the through-holes include a plurality of elongated holes arranged in parallel along a radial direction of the annular portion and having a curved shape to extend along a circumferential direction of the annular portion.

In the first aspect of the present disclosure, when the electrode tip is loosely fitted onto the curved surface of the rotary cutter with the rotary cutter to which the chip scattering prevention cover is attached being rotated about the rotation axis, a distal end of the electrode tip is cut by the blade portion of the cutting part attached to the inner surface of the cutout gap. Then, chips created at the electrode tip move to come out from an opening side of the curved surface, yet hit and bounce off the plate portion to fall within the cutout gap, thus preventing the chips from scattering around the rotary cutter. When the chip scattering prevention cover is attached to the rotary cutter, the whole chip scattering prevention cover is then positioned closer to the shaft portion than the surface of the head portion of the rotary cutter. Thus, there is no need of a space for attaching the chip scattering prevention cover on a rotary cutter surface side as described in WO2016/151623, thus enabling a smaller size of the tip dresser around the rotary cutter. Moreover, an area around the rotary cutter occupied by the chip scattering prevention cover is only a portion corresponding to the outer peripheral edge of the head portion and a portion of the head portion corresponding to the cutout gap. The chip scattering prevention cover thus has lighter weight as compared to a chip scattering prevention cover as described in WO2016/151623, which covers substantially all areas of a rotary cutter except a curved surface on a surface side of the rotary cutter. This enables a motor driving the rotary cutter to be less susceptible to a load.

In the second aspect of the present disclosure, no step is provided between the surface of the head portion of the rotary cutter and a surface of the chip scattering prevention cover, improving an appearance and a design property of the tip dresser.

In the third aspect of the present disclosure, when compressed air is applied from a head portion surface side of the rotary cutter, the compressed air strikes the cutting part though the through-holes of the plate portion, so that the chips caught by the cutting part are blown off, enabling prevention of the chips from obstructing cutting operations of the electrode tip.

In the fourth aspect of the present disclosure, as the distal end of the electrode tip is cut by the blade portion extending along a radial direction of the rotary cutter, the chips wider along the radial direction of the rotary cutter are created. These chips are then less likely to move from a cutout gap side to a surface side of the plate portion through the through-holes. Accordingly, even when the through-holes for introducing compressed air are provided in the plate portion, the chips are assuredly prevented from scattering around the rotary cutter.

DETAILED DESCRIPTION

Embodiments of the present disclosure are now described in detail with reference to the drawings. It is noted that the following description of preferred embodiments is merely an example in nature.

Figure 1:
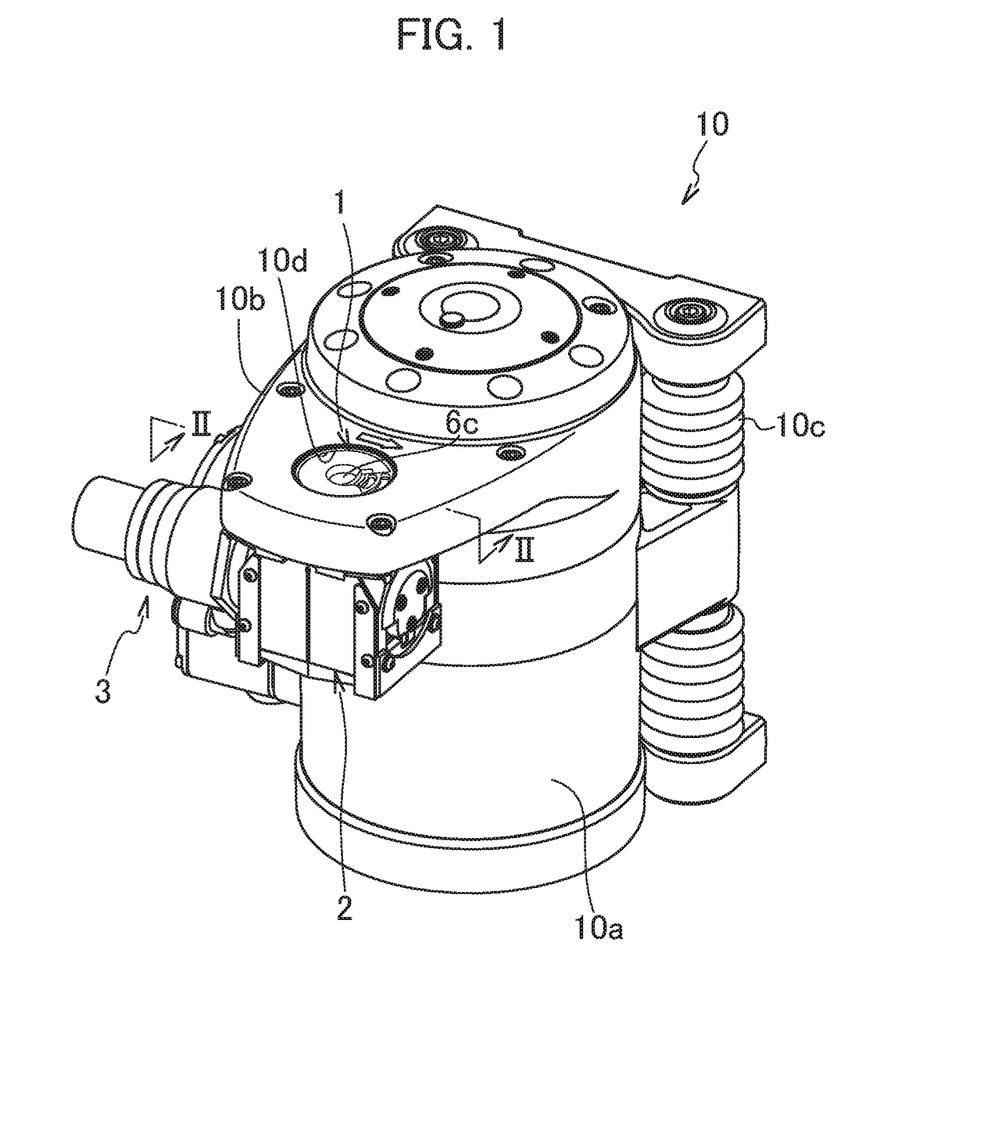
FIG. 1 is a perspective view illustrating a tip dresser having a rotary cutter to which a chip scattering prevention cover according to embodiments of the present disclosure is attached.

FIG. 1 illustrates a tip dresser 10 to which a chip scattering prevention cover 1 according to an embodiment of the present disclosure is attached. The chip scattering prevention cover 1 is provided for preventing scattering around of chips M1 that are created when distal ends 9a of electrode tips 9 attached to a spot welding gun is cut by using the tip dresser 10.

The tip dresser 10 includes a generally cylindrical motor casing 10a having a cylinder center line oriented vertically, a plate-shaped gear casing 10b extending forward of the motor casing 10a from an upper end of the motor casing 10a, and a shock absorbing mechanism 10c mounted to a rear face of the motor casing 10a and configured to absorb impact on the motor casing 10a. A drive motor that is not shown is housed inside the motor casing 10a.

Figure 2:
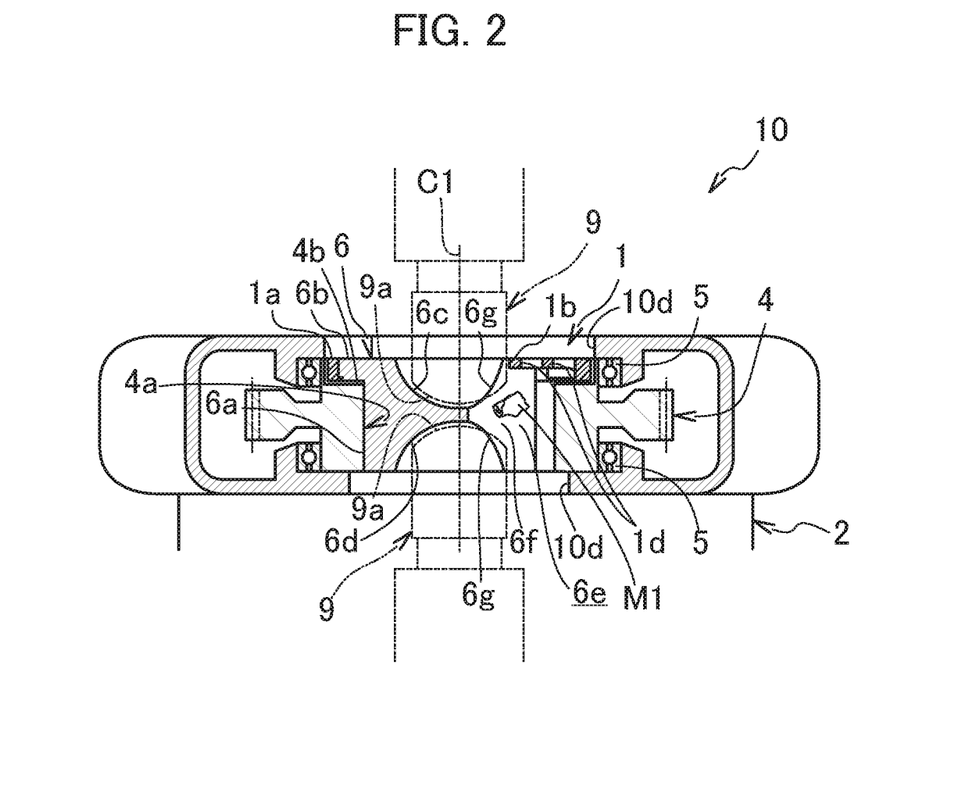
FIG. 2 is a cross-sectional view taken along the plane II-II indicated in FIG. 1.

As illustrated in FIG. 2, a pair of circular through-holes 10d facing each other are formed in top and bottom surfaces of the gear casing 10b at a center part of an extending part side of the gear casing 10b.

As illustrated in FIG. 1, a box shaped cover casing 2 is secured to the bottom surface of the gear casing 10b so as to cover a lower through-hole 10d. A tip passage hole (not shown) through which an electrode tip 9 can pass through is formed in a bottom wall of the cover casing 2.

An air suction tool 3 capable of sucking air from an inside of the cover casing 2 is connected to one of side walls of the cover casing 2 to remove chips M1 accumulated inside the cover casing 2 into an outside of the cover casing 2.

As illustrated in FIG. 2, in an interior of the gear casing 10b and between the through holes 10d, a ring shaped output gear 4 is mounted rotatably around a vertically extending rotation axis C1 via a pair of upper and lower bearings 5.

At a center of the output gear 4 is an attachment hole 4a formed to extend therethrough vertically. A step part 4b is formed in an upper portion of an inner circumferential surface of the attachment hole 4a and has an inner diameter smaller on a lower end side of the attachment hole 4a than on an upper end side.

A rotary cutter 6 for cutting distal ends 9a of electrode tips 9 is attached to the attachment hole 4a.

The rotary cutter 6 is generally T-shaped as viewed from a side. The rotary cutter 6 includes a short cylindrical shaft portion 6a having a central axis aligned with the rotation axis C1 and a disk shaped head portion 6b formed at an upper end (one end) of the shaft portion 6a and unitary with the shaft portion 6a on a back surface side thereof to have a rotation axis aligned with the rotation axis C1. When the shaft portion 6a is fitted with the attachment hole 4a, the head portion 6b corresponds to the step part 4b.

An upper curved surface 6c hemispherically recessed to open upward is formed at a center of a top surface of the head portion 6b. An electrode tip 9 can be loosely fitted onto the upper curved surface 6c from above in the state a central axis of the electrode tip 9 is aligned with the rotation axis C1.

A lower curved surface 6d hemispherically recessed to open downward is formed at a center of a bottom surface of the shaft portion 6a. An electrode tip 9 can be loosely fitted onto the lower curved surface 6d from below in the state the central axis of the electrode tip 9 is aligned with the rotation axis C1.

Figure 3:
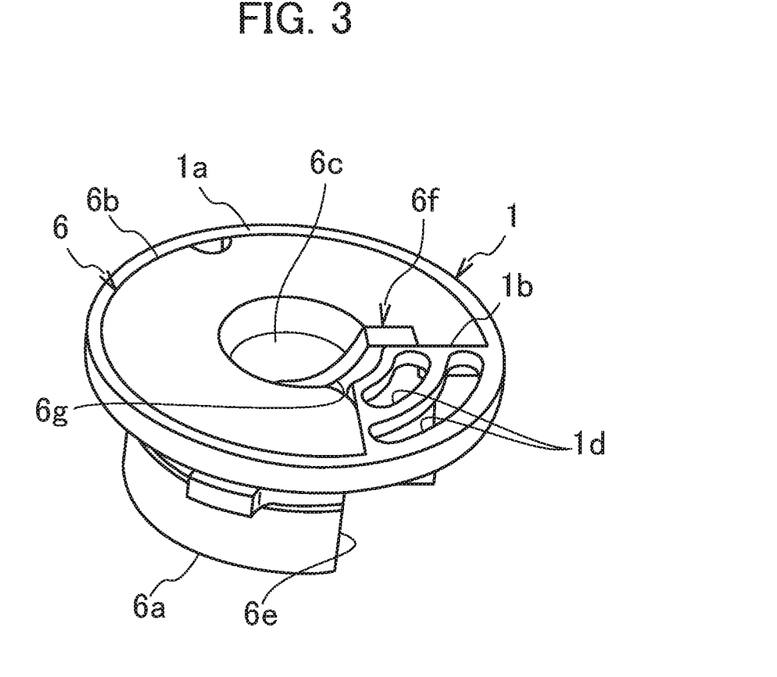
FIG. 3 is a perspective view illustrating a rotary cutter to which a chip scattering prevention cover according to embodiments of the present disclosure is attached.
Figure 4:
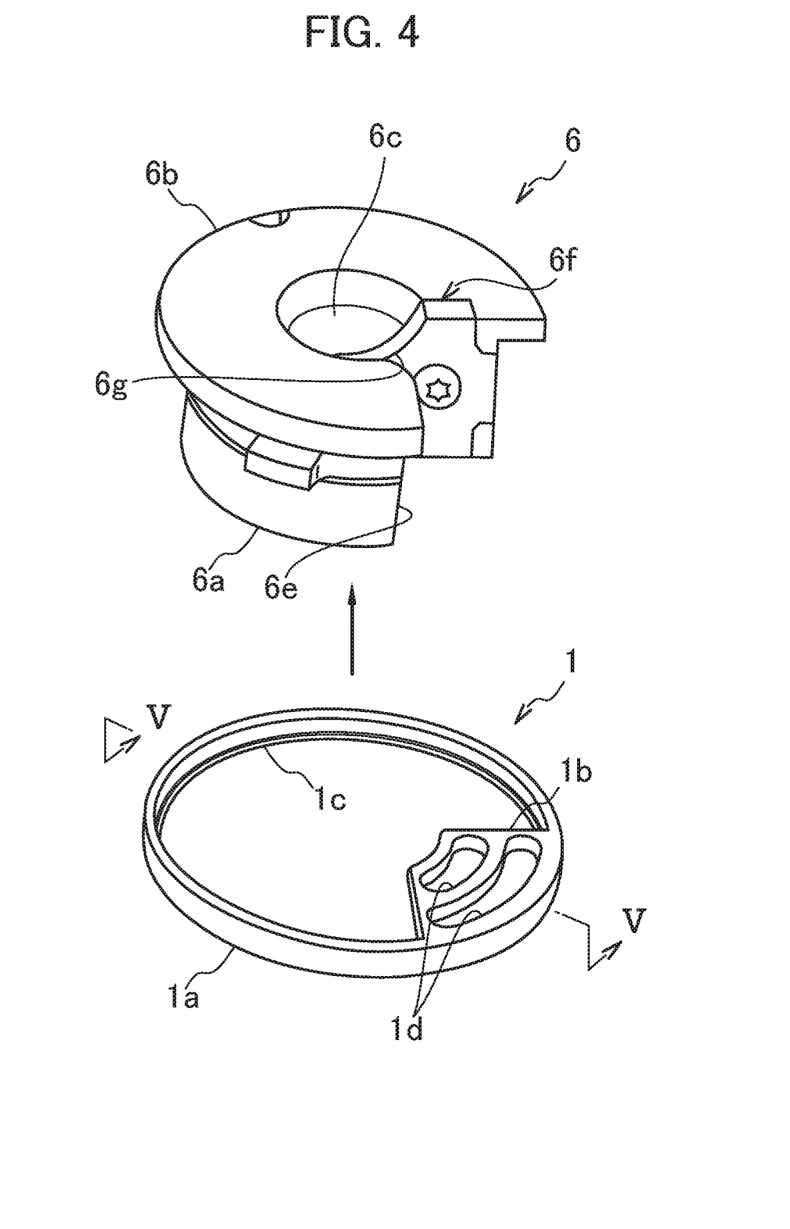
FIG. 4 is a perspective view showing a state immediately before a chip scattering prevention cover according to embodiments of the present disclosure is attached to a rotary cutter.

As illustrated in FIGS. 3 and 4, a cutout gap 6e having a generally circular sector shape in a cross-sectional view is formed in a side of the shaft portion 6a and the head portion 6b, and extends along the rotation axis C1 to cut out the shaft portion 6a and the head portion 6b in a continuous manner. The cutout gap 6e includes upper and lower ends reaching the upper and lower curved surfaces 6c and 6d, respectively.

A plate shaped cutting part 6f is attached to one of inner surfaces of the cutout gap 6e and has an arrow shape in a side view.

The cutting part 6f includes a pair of blade portions 6g vertically arranged and extending in a direction intersecting with the rotation axis C1. While an upper blade portion 6g is curved to correspond to the upper curved surface 6c, a lower blade portion 6g is curved to correspond to the lower curved surface 6d.

A chip scattering prevention cover 1 obtained by integral molding of a resin material is detachably attached to an outer peripheral edge of the head portion 6b of the rotary cutter 6.

Figure 5:
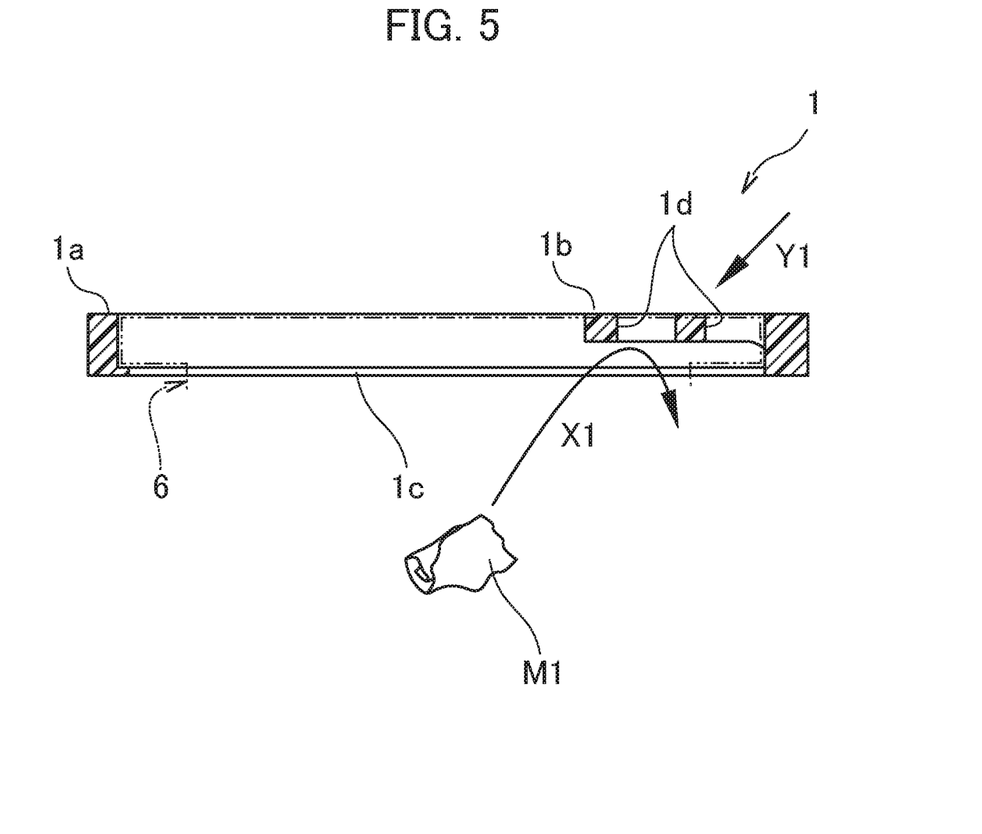
FIG. 5 is a cross-sectional view taken along the plane V-V indicated in FIG. 4.

As illustrated in FIGS. 3 to 5, the chip scattering prevention cover 1 includes an annular portion 1a fitted over the outer peripheral edge of the head portion 6b of the rotary cutter 6, and a plate portion 1b extending inwardly of the annular portion 1a from a peripheral edge portion of one of openings of the annular portion 1a. The annular portion 1a and the plate portion 1b are flush with each other on a front surface side of the chip scattering prevention cover 1.

As illustrated in FIG. 5, an annular rib 1c protruding in a direction orthogonal to a central axis of the annular portion 1a is formed on a peripheral edge portion of the other of the openings of the annular portion 1a. When the annular portion 1a is fitted over the head portion 6b of the rotary cutter 6 from the bottom side (shaft portion 6a side), it is configured that the annular rib 1c contacts the head portion 6b and that the annular portion 1a and the plate portion 1b are flush with a front surface of the head portion 6b.

On the other hand, as illustrated in FIGS. 3 and 4, the plate portion 1b has a generally circular sector shape in a planar view and covers an area of the cutout gap 6e corresponding to the head portion 6b in the state that the annular portion 1a is fitted over the head portion 6b.

In the plate portion 6b, two elongated holes 1d (through-holes) extending through in a plate thickness direction are arranged in parallel along a radial direction of the annular portion 1a. The two elongated holes 1d have a curved shape so as to extend along a circumferential direction of the annular portion 1a.

When the output gear 4 is turned, via a gear meshing mechanism (not shown), by a rotational drive of the drive motor housed in the motor casing 10a, the rotary cutter 6 rotates together with the output gear 4. As distal ends 9a of a pair of electrode tips 9 placed vertically facing each other are respectively fitted loosely onto the upper and lower curved surfaces 6c, 6d of the rotary cutter 6 that is rotating, the blade portions 6g cut the distal ends 9a of the respective electrode tips 9.

When the blade portions 6g cut the distal ends 9a of the respective electrode tips 9, chips M1 are created at the distal ends 9a of the electrode tips 9. As illustrated in FIG. 2, the chips M1 fall within the cover casing 2 through the cutout gap 6e.

In doing so, some of the chips M1 created from an upper electrode tip 9 move to come out from an opening side of the upper curved surface 6c, yet hit and bounce off the plate portion 1b to fall within the cutout gap 6e as illustrated with the arrow X1 indicated in FIG. 5, thus preventing the chips M1 from scattering around the rotary cutter 6.

Thus, according to the embodiment of the present disclosure, the chip scattering prevention cover 1 can prevent the chips M1 from scattering around the rotary cutter 6.

In the chip scattering prevention cover 1 of the present disclosure, an area occupied by the chip scattering prevention cover 1 around the rotary cutter 6 is only a portion corresponding to the outer peripheral edge of the head portion 6b and a portion of the head portion 6b corresponding to the cutout gap 6e. Accordingly, the chip scattering prevention cover 1 of the present disclosure has lighter weight as compared to the chip scattering prevention cover as described in WO2016/151623, which covers substantially all areas of the rotary cutter 6 except the upper curved surface 6c on a front surface side of the rotary cutter 6. This enables the motor driving the rotary cutter 6 to be less susceptible to a load.

When the annular portion 1a is fitted over the head portion 6b of the rotary cutter 6, the annular portion 1a and the plate portion 1b are flush with the front surface of the head portion 6, providing no step between front surfaces of the head portion 6b of the rotary cutter 6 and the chip scattering prevention cover 1. This improves an appearance and the tip dresser 10 is able to have an improved design property.

The two elongated holes 1d are then formed in the plate portion 1b. As illustrated with the arrow Y1 indicated in FIG. 5, when compressed air is applied from a front surface side of the head portion 6b of the rotary cutter 6, the compressed air hits the cutting part 6f though the elongated holes 1d of the plate portion 1b. Thus, the chips M1 caught by the cutting part 6f can be blown off, enabling prevention of the chips M1 from obstructing cutting operations of the electrode tip 9.

As the distal ends 9a of the electrode tips 9 are cut by the blade portions 6g extending along a radial direction of the rotary cutter 6, the chips M1 wider in the radial direction of the rotary cutter 6 are generally created. The elongated holes 1d of the embodiment of the present disclosure each have a curved shape so as to extend along a circumferential direction around the rotation axis C1, and are arranged in parallel along a radial direction of the annular portion 1a. Thus, the chips M1 are less likely to move from a cutout gap 6e side to a front surface side of the plate portion 1b through the elongated holes 1d. Accordingly, even when the elongated holes 1d for introducing compressed air are provided in the plate portion 1b, the chips M1 can be assuredly prevented from scattering around.

In the embodiment of the present disclosure, when the annular portion 1a is fitted over the head portion 6b of the rotary cutter 6, it is configured that the annular rib 1c contacts the head portion 6b and that the annular portion 1a and the plate portion 1b are flush with the front surface of the head portion 6b; however, the annular portion 1a and the plate portion 1b may be arranged such that the annular portion 1a and the plate portion 1b do not protrude beyond the level of the front surface of the head portion 6b, as the annular portion 1a is fitted over the head portion 6b. In doing so, the whole chip scattering prevention cover 1 is positioned closer to the shaft portion 6a than the front surface of the head portion 6b of the rotary cutter 6, so that no space for attaching the chip scattering prevention cover 1 on a rotary cutter 6 front surface side is needed, thus enabling a smaller size of the tip dresser 10 around the rotary cutter 6.

In the embodiment of the present disclosure, the annular portion 1a of the chip scattering prevention cover 1 is fitted over the head portion 6b of the rotary cutter 6 from the bottom side (shaft portion 6a side); however, the annular portion 1a may be fitted over from the top side (opposite side to the shaft portion 6a).

In the embodiment of the present disclosure, the annular portion 1a and the plate portion 1b are flush with one another on a chip scattering prevention cover 1 front surface side; however, the annular portion 1a and the plate portion 1b are not necessarily in the flush position.

In the embodiment of the present disclosure, the two elongated holes 1d are formed in the plate portion 1b; however, only one, or three and more elongated holes 1d may be formed.

In the embodiment of the present disclosure, the elongated holes 1d formed in the plate portion 1b have the curved shape to extend along the circumferential direction of the annular portion 1a; however, the present disclosure is not limited to this configuration. The elongated holes 1d may have a linear shape to extend along the radial direction of the annular portion 1a or may have other shapes.

In embodiments of the present disclosure, the chip scattering prevention cover 1 is obtained by integral molding of a resin material, yet may be formed of other materials.

The present disclosure is suitable for a chip scattering prevention cover for preventing chips created in cutting operations from scattering when distal ends of electrode tips of spot welding are cut by using a tip dresser.

What is claimed is:

1. A chip scattering prevention cover which is configured to be attached to a tip dresser rotary cutter including a shaft portion having a central axis aligned with a rotation axis; a disk shaped head portion formed at one end of the shaft portion and unitary with the shaft portion on a back surface side thereof to have a central axis aligned with the rotation axis; a curved surface formed at a center of the head portion and capable of fitting loosely an electrode tip for spot welding with a central axis of the electrode tip being aligned with the rotation axis; a cutout gap extending along the rotation axis to reach the curved surface for a continuous cutout in the shaft portion and the head portion; and a cutting part configured to be attached to an inner surface of the cutout gap, having a blade portion that extends in a direction intersecting with the rotation axis, and configured to cut by the blade portion the electrode tip loosely fitted onto the curved surface due to rotation about the rotation axis, for preventing chips created during cutting of the electrode tip by the blade portion from scattering, the chip scattering prevention cover comprising:

an annular portion configured to be detachably fitted over an outer peripheral edge of the head portion; and a plate portion extending inwardly of the annular portion from an inner circumference portion of the annular portion and having a corresponding shape to the cutout gap, the plate portion configured to fit with a region of the cutout gap corresponding to the head portion to cover the cutout gap when the annular portion is fitted over the head portion, wherein the annular portion and the plate portion are positioned not to protrude beyond a level of a surface of the head portion of the rotary cutter toward an opposite side of the head portion from the shaft portion when the annular portion is fitted over the head portion.

2. The chip scattering prevention cover according to claim 1, wherein the annular portion and the plate portion are flush with the surface of the head portion when the annular portion is fitted over the head portion.

3. The chip scattering prevention cover according to claim 1, wherein one or more through-holes extending through in a plate thickness direction are formed in the plate portion.

4. The chip scattering prevention cover according to claim 3, wherein the through-holes include a plurality of elongated holes arranged in parallel along a radial direction of the annular portion and having a curved shape to extend along a circumferential direction of the annular portion.

5. The chip scattering prevention cover according to claim 1, wherein the rotary cutter is configured to be attached to an attachment hole of an output gear that is rotatable about the rotation axis, and the attachment hole includes a step part corresponding to the head portion as the shaft portion is fitted with the attachment hole, wherein the plate portion is provided in one of peripheral edge portions of an opening of the annular portion, and an annular rib protruding inwardly of the annular portion is provided in another of the peripheral edge portions of the opening of the annular portion, and wherein when the annular portion is fitted over the head portion from a shaft portion side, the annular rib contacts the head portion, and the annular portion and the plate portion are positioned not to protrude beyond the level of the surface of the head portion toward the opposite side of the head portion from the shaft portion.

* * * * *